United States Patent [19]

Flores

[11] 4,189,328
[45] Feb. 19, 1980

[54] METHOD OF PRODUCING A GREENER SHADE ALKALI BLUE PRODUCT AND PRODUCT PRODUCED THEREBY

[75] Inventor: Robert J. Flores, Alsip, Ill.

[73] Assignee: The Sherwin-Williams Company, Cleveland, Ohio

[21] Appl. No.: 939,337

[22] Filed: Sep. 5, 1978

[51] Int. Cl.$^2$ ............................................. C09B 11/10
[52] U.S. Cl. .................................. 106/288 Q; 260/392
[58] Field of Search .......... 106/288 Q, 308 G, 308 N; 260/392, 391

[56] References Cited

U.S. PATENT DOCUMENTS

| 2,429,081 | 10/1947 | Steuber | 260/391 |
| 3,057,776 | 10/1962 | Short et al. | 260/392 |
| 4,032,357 | 6/1977 | Rees et al. | 106/288 Q |

*Primary Examiner*—Helen M. McCarthy
*Attorney, Agent, or Firm*—Richard G. Smith; James V. Tura

[57] ABSTRACT

This invention is concerned with the modification of the hue of Alkali Blue pigments of known organic structures by intimate incorporation under aqueous alkaline conditions of a minor amount of a phenolic compound, illustratively beta naphthol. Upon recovery of the treated pigment under aqueous acid conditions, the hue of Alkali Blue is modified from a generally red shade blue to the greener end of the spectrum. The invention provides a novel means of color control and color modification with consequent correlative new compositions of matter.

7 Claims, No Drawings

METHOD OF PRODUCING A GREENER SHADE ALKALI BLUE PRODUCT AND PRODUCT PRODUCED THEREBY

This invention relates to a new and improved Alkali Blue pigment composition whose shade has been so controlled or modified as to produce a greener shade blue than the known red and violet shades and equivalent to certain proprietary green shade blues known heretofore. The invention can also be used for the control with red and violet shade Alkali Blues to hold the redness thereof to a more demanding standard than provided by presently known techniques.

The Alkali Blue pigments of this invention are in a dry or flushed color form and are further dispersable in organic binder vehicles for a wide variety of end uses including paints, printing inks, plastics, carbon paper, etc., where the highly efficient use of the colorant is material to and the undertone or shade of the pigment is material to the overall color effect obtained.

The term "Alkali Blue" is generally known in the art and it is hereby defined and used herein to mean and include a sulfonated phenylated rosaniline or para rosaniline of the general structure:

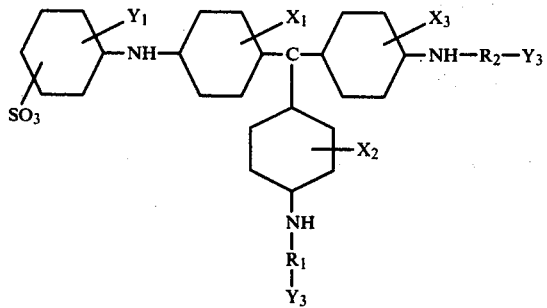

where $R_1$ and $R_2$ are phenyl or hydrogen, $X_1$, $X_2$, $X_3$ and $Y_1$ are hydrogen or alkyl groups less than 4 carbons, and $Y_2$ and $Y_3$ are hydrogen or alkyl groups of 1 to 4 carbons when $R_1$ and $R_2$, respectively, are phenyl. In the usual commercial form and as more specifically used herein in the examples for illustrative purposes $Y_1$, $Y_2$ and $Y_3$ are hydrogen and $X_1$, $X_2$ and $X_3$ are hydrogen and methyl.

The shade of Alkali Blues have, in general, been controlled by the extent of phenylation. Control of phenylation allows manufacture of the three shade categories customarily marketed. Thus, violet shade Alkali Blue is mostly diphenylated but contains considerable monophenylated, some triphenylated, and sometimes unphenylated dye structure. Red shade Alkali Blue is mostly triphenylated but contains considerable diphenylated and some monophenylated structure. Green shade Alkali Blues are mostly triphenylated but usually contain a small amount of diphenylated structure as well as some impurities probably caused by vigorous conditions of phenylation.

The greenest shade blue achievable by phenylation control is not sufficiently green enough for many color applications of Alkali Blue. Attempts to force the shade of Alkali Blue to greener hues by forcing phenylation conditions are counterproductive. Too vigorous phenylation conditions, such as excessive temperature and too long a phenylation time leads to degradation of the unsulfonated intermediate known as Spirit Blue. Degradation of Spirit Blue leads to loss of yield, dullness of shade, and some loss in tinting strength of the resultant Alkali Blue.

This invention discloses additives, which can be processed into Alkali Blue to cause the hue of the present greenest shade Alkali Blue to be further modified towards the greener end of the spectrum. Through use of these novel additives, the greenest Alkali Blue products commercially available can be made without destroying yield through forcing phenylation conditions.

The additives described in this invention can also be used to modify and control redder shade categories of Alkali Blue. Shade control at the phenylation stage is rather crude, usually to loose for the fine control desirable to meet color quality standards under production conditions. Because of inability to practice fine shade control during phenylation, usual commercial practice has been to blend selected batches of violet, red, and the redder green shade Alkali Blues to "fine tune" the final shade. Blending involves time consuming and uneconomical practices. Thus, when inventory stocks do not contain the right quantities needed or shades for blending, production and shipping schedules suffer. The present invention can be used for customer shade control preferences by phenylating slightly to the red side of standard. The hue of the Alkali Blue can then be modified to that of a specific customer standard while the batches are still in the process. Blending is thereby avoided in most cases.

A review of the available art relating to Alkali Blue and its variations revealed no references to means or methods of producing a more green quality hue in Alkali Blue. As far as could be determined, no publications were found relating to greening of Alkali Blue, yet Alkali Blues of very green hue are known to exist. It must be presumed the compositions and methods by which the very green Alkali Blues are made are trade secrets of the producers thereof.

This invention is generally reduced to practice by dispersing and preferably dissolving selected sulfonated Alkali Blue presscake from the prior art classes briefly described above and known in the art along with at least one additive agent into an aqueous alkaline (~2.6% NaOH) solution by heating the mixture of Alkali Blue pigment (presscake) and water to less than about 100° C. (boiling temperature). This is a convenient temperature reached by passing live steam through the container. After thorough dispersion has been obtained, the solution may or may not be allowed to cool. The greening agent may also be conveniently added directly to the aqueous alkaline solution of the Alkali Blue pigment where both are fully dissolved. Small amounts of surfactants, of benefit to the end use of the Alkali Blue may also be added to the aqueous alkaline mass. (See Rees & Flores U.S. Pat. No. 4,032,357) The dispersion and/or solution, usually hot, is then filtered through a semi-fine filter into a large excess of water made acid, usually with HCl or $H_2SO_4$ and stirring with good agitation. Typically, the pH before drown is pH 11 to 12 and after drown pH is 0.8 to 1.2. If pH exceeds about 4.5, more acid should be added. Small amounts of surfactants may or may not be added to the acid mix, either before or after the drowning. Likewise, the greening agent may be added to the acid mix before or after the drowning instead of to the alkaline solution; however it is deemed advantageous that a more uniform and intimate mixture with Alkali Blue colorant is obtained when the additive is directly incorporated in the alkaline solution at above room temperature.

A heat treatment provides preferred practice and is beneficial to end uses of the Alkali Blue. Heat treatment is performed on the drowned, acidified mixture in which case the pH should preferably be below 2.0. In case there is insufficient acid in the initial acid solution, additional acid may be added. The acidic drowned mix is heated for the heat treatment to any required temperature, typically about 95° C. and held at the desired temperature typically about 15 minutes. After the heat treatment, the mix is usually flooded to a lower temperature, most often about 70° C., after which the pH is customarily raised with ammonia to pH 3.0 to 4.5. The presscake is then recovered and washed.

The presscake may be flushed into a typical flush color class of varnish vehicle or dried to a toner. The surfactants, which may have been added during the processing, will have been chosen depending on whether the presscake is to be dried or flushed and depending on the expected end use application of the Alkali Blue.

Selection of the greening agent to be used depends on the particular end of undertone color or shade desired as determined by prior blending and by prior experience with the greening agents disclosed herein to be useful. Beta naphthol is recommended as a good selection based on relatively low price, toxicity, and odor and its ready availability. Other greening agents of the phenolic type may be preferred, however, as changing conditions and demand of the market place dictates. Blends of one or more greening agents in combinations are also useful.

The ratio of greening agent to dry basis Alkali Blue is anywhere from 0.5 part greening agent to 20 part greening agent per 100 part Alkali Blue. (Parts by weight.) The preferred range is 2 to 10 parts by weight greening agent per 100 weight of parts Alkali Blue. For shading control of redder shade Alkali Blues, the amounts used depends on how far the production batches are from shipping standards, but will lie in the ranges above. Experience in the art will develop the skill to allow choice of the proper amounts and selections of qualities of greening agent to add, depending on pretests of the batches.

The "greening agents" found useful in color (shade or hue) control in the various Alkali Blue products of this invention appear generically to include aromatic ring structures having at least one hydroxyl (phenolic not alcoholic hydroxyl) substituent and within this generic structure species of the following classes have given interesting physical color modifying results. As these classes all are known to have some toxic qualities and offer possible malodorous contributions to the final colorant, some selections therefrom may not always be practically useful for some end product applications. Species of all these classes of greening materials have potential use in "greening" of Alkali Blue pigments as has been hereinbefore generally mentioned. These agents or additives include: (1) lower alkyl (methyl) phenols, (2) nitro cresols, (3) halogenated phenols, halogenated cresols, resorcinol and halogenated naphthols, (4) naphthols, cresols and amino phenols. In selecting species from the above, care should be exercised to select those most insoluble in aqueous acid medium at pH less than about five and further characterized by melting points greater than about 35° C.

Specific agents found to be useful in meeting customer requirements, include in the order of preference: beta naphthol, alpha naphthol, 3,4-dimethyl phenol, pentachlorophenol and meta-nitroparacresol. There are seven known isomers of dimethyl phenols, nine known isomers of dihydroxy naphthalenes, also isomers of chloronaphthols, chlororescorcinol and some nitrophenols and dichloronaphthols which have not been fully investigated, but which at the present time look promising as greening agents and are in accord with the methods generally set out above.

There are a number of substances which, when added to Alkali Blue in like manner as the claimed additives lead to slight greening effects. However, in most of these cases the green shift is not great enough to be equivalent to the claimed additives and also not great enough to allow the very green shade blues desired for certain applications. Rosin is one substance which has a mild greening effect toward Alkali Blue. Long chain fatty amines (such as those marketed by Armak under the trade names Armeens) are other examples of mild greening agents. However, rosin and the fatty amines, in addition to being poorer greening agents than additives disclosed and claimed herein also, adversely affect the flushing process when tried as greening agents for flushed color. Rosin and fatty amines tend to emulsify water into the flushing vehicle. The preferred class of phenolic greening agents not only green Alkali Blue significantly more than rosin or fatty amines but they do not adversely affect the flushing process.

There are other substances which our experience indicates have even milder greening effects than rosin or fatty amines. Examples therefrom include ethylene diamine, melamine, ortho and paratoluidine, sulfanilic and salicylic acids. In some instances these can be used, however, in combination with those claimed for special effects.

Certain proprietary green shade Alkali Blues are known to exist on the marketplace. Certain very green shade Alkali Blues have been found to be greened with diphenylamine or naphthenic acid as additives. The phenolic greening agents of this invention are fully equivalent thereto as to color development and provide viable alternatives. Alternatives are desirable because of the objectionable odor of naphthenic acid and because of the uncertain availability of diphenylamine. Mixtures of the newly discovered greening agents with diphenylamine or naphthenic acid have been found to provide in our combination, however, excellent greening agents and are included as a part of this invention, as well as the phenolic additives above, as treated of herein.

In summary, this invention gives a product which is equivalent to the very greenest blue hue quality Alkali Blue product heretofore known and provides a process for producing the same. In essence, the method involves treatment of Alkali Blue pigment with a class of aromatic ring structure compounds containing at least one phenolic hydroxyl group (as distinguished from alcoholic hydroxyl substituents). Both single and fused multiple ring substituted chemical structures embrace operable species. The greening agent is conveniently added to the Alkali Blue while the Alkali Blue is in alkaline solution prior to drowning in dilute acid. Dilution thereby precipitates pigmentary Alkali Blue.

However, the greening agent may also be added after precipitating pigmentary Alkali Blue. A general finding is that from about 0.5% to 20%, preferably 2% to 10%, of greening agent, based on the dry weight of original Alkali Blue pigment solids will provide commercially desirable hue modified Alkali Blue pigment end compositions. The amount will vary somewhat depending upon the final hue desired and the particular Alkali Blue pigment composition selected for color modification.

To be operable in the process the additive hydroxy substituted aromatic structures may also have other substituents including as illustrative alkyl groups, and halogen substituents on the ring have shown advantages. Our preliminary survey indicates that there is some value to nitro and amino substituent on the ring structure, as well. Specifically lower alkyl phenols, halogenated phenols, halogenated cresols, halogenated naphthols, resorcinol, nitro cresols, cresols and naphthols having not only the single essential hydroxy substituent but additional hydroxyl groups, and amino phenols. These ring substituents often assist in increasing the m.p. (melting point) to above about 35° C. as well as to contribute advantageously to insolubility in water at acid pH of less than five.

Experimental uses indicate that the more specific interest presently centers about alpha naphthol, beta naphthol, 3,4-dimethyl phenol, pentachlorophenol and meta-nitroparacresol and combinations thereof as these agents are used in commercial practice.

The following examples specifically illustrate the best methods presently known and used to practice this invention; but are not to be construed as exhaustive.

EXAMPLE I (a) 200 g. on a dry basis of a sulfonated Alkali Blue presscake (Sherwin-Williams batch 7G-529)

525 ml. water 52.5 g. of 50% NaOH in water solution were stirred and heated by live steam to 98° C. and held for a crisp, red, clear solution.

(b) 13.2 g. beta naphthol was dissolved in 306 ml. water containing 4.6 g. NaOH.

(c) The aqueous solution of beta naphthol (b) was added to the alkaline solution of Alkali Blue (a) and after incorporation, the solution was filtered into (d) 787 ml. of water containing 93 ml. of 31.5% HCl.

(e) The pH was 1.3 and was adjusted to 1.1 with additional HCl. The acidified mixture was heated to 95° C., and held for 15 minutes. The acidified content was then flooded with water to a temperature of 65° C. and pH was adjusted to 3.3 to 3.8 with dilute ammonia.

(f) The precipitated pigment was filtered, washed with 6 rinses of 2000 ml. of hot water and the filtercake recovered with all free water removed for flushing. 185 g., dry basis, of treated Alkali Blue pigment was recovered. The presscake was flushed into an oleoresinous varnish vehicle. The shade was found to meet the established commercial standard. Color strength was not diminished, and was somewhat stronger than standard.

EXAMPLE II

To demonstrate the positive effect of the beta naphthol treatment, a control was run just like Example I but without use of any greening additive naphthol. Results were comparable in every way except hue. Example I compared to Example II was moderately to considerably greener in hue then the control.

EXAMPLE III

Essentially the same steps and quantities of materials were processed as in Example I, with the substitution of alpha naphthol for beta naphthol. The treated Alkali Blue flushed over very well and the color was converted over to the green shade standard and approved for hue.

EXAMPLE IV

Two aliquot portions of Alkali Blue were weighed out as in Example I. To aliquot 4a was added in place of the beta naphthol of Example I an equivalent amount of meta-nitroparacresol in the step of the process where the greening treatment is employed. To aliquot 4b was added, in lieu of beta naphthol, an equivalent amount of pentachlorophenol. The processing was completed as described in Example I. While both greening agents gave satisfactory hue change to the processed Alkali Blue, Example IV-b was observed to contain some gritty particles. The source of this is not presently known but is suspected to have come from a dirty steam line. Both 4a and 4b samples were approved based on the commercial color standard.

EXAMPLE V

Example I was repeated, except the greening agent contained 60 parts naphthenic acid with 40 parts beta naphthol, the quantity of agent, in total, remaining at about 12 parts by weight (grams) per 200 parts by weight of Alkali Blue. Through this and similar runs it was established that admixtures of greening agents selected from the classes discussed above were also useful for the purposes of the invention.

Small amounts of the presscakes from Examples I through V were dried at 70° C. and pulverized. When compared to the control (Example II) all examples were moderate to considerably green in hue, showing the effects of the greening agents on flushed color are retained upon drying.

It is the practice in the industry to improve the dispersion performance of dry color by adding proprietary surface active agents and/or resins to Alkali Blue before drying. The claimed greening agents are generally compatible with most surface active agents and independently perform their greening function when incorporated in typical toner formulas. Likewise, it is often the practice in industry to add various proprietary additives to Alkali Blue to aid the flushing process and to produce easily dispersed dry pigments and incorporation of the claimed greening agents with such additives is also perfectly suitable.

It has been found through a number of screening tests that there are agents having good greening effect upon Alkali Blue pigments and flush colors, and those which are milder when used in pure form, and those which apparently have no effect upon the hue of the final Alkali Blue. The possible workable (commercially useful) combinations using those agents of both effective classes has been promising both technically and economically in the art to which this specification is directed.

Having described and illustrated the best mode known to me to practice the invention disclosed, what I claim is:

1. A method for producing Alkali Blue pigments of enhanced green hue which comprises dispersing an Alkali Blue pigment and a minor quantity of at least one additive agent in an aqueous alkaline solution, heat-treating said admixture but not above the boiling point thereof, thereafter acidifying the aqueous admixture to a pH of less than five and recovering said hue modified Alkali Blue, said additive agent comprising at least one substituted aromatic single and/or multiple-fused ring structure having at least one phenolic hydroxyl group substituent and further characterized by substantial water insolubility at pH of less than five and said additive melting point greater than about 35° C.

2. A method for hue control of Alkali Blue pigments and pigmenting dispersions thereof which comprises at least partially dissolving said pigment in an aqueous alkaline solution, further incorporating in said intimate aqueous mixture a minor quantity of greening agent sufficient to direct the hue of said Alkali Blue pigment towards the green shade, said additive agent comprising at least one substituted aromatic single and/or double fused ring structure, said ring substituent comprising at least one hydroxyl group, said agent further characterized by substantial water insolubility at pH less than five and in that form having a melting point of greater than about 35° C., thereafter subjecting said aqueous alkaline solution to heating but not above the boiling point thereof, acidifying and insolubilizing said additive agent and Alkali Blue pigment, and recovering said treated pigment solids.

3. An Alkali Blue pigment of enhanced greenish hue which comprises a major amount of acid precipitated Alkali Blue, said pigment intimately admixed with a minor amount of a greening agent comprising at least one substituted aromatic single and/or multiple fused ring structure, said ring substituents comprising at least one phenolic hydroxyl group and further characterized by substantial water insolubility at pH less than five and in that form having a m.p. greater than about 35° C.

4. The method of claim 1, where the additive agent consists of at least one substituted aromatic single and-/or double fused ring structure having at least one phenolic hydroxyl substituent and which comprises: (1) lower alkyl phenols, (2) halogenated phenols, halogenated cresols, halogenated naphthols and resorcinol, (3) nitro cresols, (4) naphthols, cresols and amino phenols.

5. The method of claim 4, where the greening agent is at least one of the group of substituted aromatic ring structures consisting of alpha naphthol, beta naphthol, 3,4-dimethyl phenol, penta-chlorophenol and meta-nitroparacresol.

6. The product of claim 3 where the greening agent is at least one of the group of substituted aromatic single and/or double fused ring structures having at least one phenolic hydroxyl substituent which comprises: (1) lower alkyl phenols, (2) halogenated phenols, halogenated cresols, halogenated naphthols and resorcinol, (3) nitro cresols, (4) naphthols, cresols and amino phenols.

7. The product of claim 6 where at least one of the greening agents is selected from the group of substituted aromatic ring structures consisting of alpha naphthol, beta naphthol, 3,4-dimethyl phenol, pentachlorophenol and meta-nitroparacresol and combinations thereof.

* * * * *